(12) United States Patent
Knebel, III et al.

(10) Patent No.: US 8,490,285 B2
(45) Date of Patent: Jul. 23, 2013

(54) METHODS OF MAKING COMPRESSION SPRINGS

(75) Inventors: Andy Knebel, III, Duvall, WA (US); Charles F. Pepka, Bellevue, WA (US)

(73) Assignee: Renton Coil Spring Company, Renton, WA (US)

( * ) Notice: Subject to any disclaimer, the term of this patent is extended or adjusted under 35 U.S.C. 154(b) by 129 days.

(21) Appl. No.: 13/229,569

(22) Filed: Sep. 9, 2011

(65) Prior Publication Data

US 2012/0000073 A1   Jan. 5, 2012

Related U.S. Application Data

(62) Division of application No. 12/035,363, filed on Feb. 21, 2008, now abandoned.

(51) Int. Cl.
*B21F 35/00*   (2006.01)
*F16F 1/12*   (2006.01)

(52) U.S. Cl.
USPC ............... 29/896.91; 29/896.93; 29/896.9; 267/167; 267/179

(58) Field of Classification Search
USPC .. 29/896.9, 896.91, 896.92, 896.93; 267/166, 267/166.1, 167, 179
See application file for complete search history.

(56) References Cited

U.S. PATENT DOCUMENTS

| | | | |
|---|---|---|---|
| 1,523,225 A | 1/1925 | Lukens | |
| 2,026,007 A | 12/1935 | White | |
| 2,236,047 A * | 3/1941 | Wattleworth | ............. 29/43 |
| 2,473,027 A | 6/1949 | Keysor | |
| 2,695,169 A | 11/1954 | Keysor | |
| 2,700,540 A | 1/1955 | Juhasz | |
| 3,751,025 A | 8/1973 | Beery et al. | |
| 3,844,069 A * | 10/1974 | Shank | ............. 451/269 |
| 4,441,696 A | 4/1984 | Buzinski | |
| 5,454,150 A * | 10/1995 | Hinke et al. | ............. 29/896.9 |
| 5,464,198 A | 11/1995 | Yanko et al. | |
| 5,642,875 A | 7/1997 | Albers et al. | |
| 5,769,722 A | 6/1998 | Uehara | |
| 5,791,638 A | 8/1998 | Balsells | |
| 7,175,512 B2 | 2/2007 | Huntington et al. | |
| 2002/0190451 A1 | 12/2002 | Sancaktar et al. | |

* cited by examiner

*Primary Examiner* — Sarang Afzali
(74) *Attorney, Agent, or Firm* — Lowe Graham Jones PLLC

(57) ABSTRACT

Compression springs, such as helical compression springs, include end portions with selectively contoured inner contact surfaces. The selective contours of the inner contact surfaces may take the form of planar, grooved, concave, or other shaped, non-circular surfaces. In addition, enough of the inner contact surface is contoured to reduce the contact stress and/or stress concentration effects on the adjacent coils when the compression spring is placed under load and the adjacent coil engages or contacts the respective end portion. The selective contouring of the end portions may be accomplished by holding the spring in a holder and moving a cutter relative to the end portion of the spring to remove the desired amount of material from the end portion.

13 Claims, 6 Drawing Sheets

METHODS OF MAKING COMPRESSION SPRINGS

PRIORITY CLAIM

This application constitutes a divisional of commonly-owned U.S. application Ser. No. 12/035,363 filed on Feb. 21, 2008, now abandoned, the content of which are incorporated by reference.

FIELD OF THE INVENTION

This invention relates generally to compression springs and methods of making the same, and more specifically to compression springs having end portions with selectively contoured inner contact surfaces.

BACKGROUND OF THE INVENTION

Conventional compression springs are used in a variety of applications. By way of example, FIG. 1 shows one such application of a conventional compression spring 12 employed in a Detroit Locker® differential 10. In this type of application, the conventional compression spring 12 operates to bias the differential into an engaged or disengaged configuration.

FIG. 2 shows a cross-sectional view of another conventional compression spring 50 that takes the form of a round-wire helical compression spring wound about a longitudinal axis 52. The round-wire includes a wire diameter 54 formed about a mean spring diameter 56 with the various coils separated according to a desired pitch 55. In addition, the conventional compression spring 50 includes oppositely facing end surfaces 58, 60 formed on respective end portions 62, 64. The oppositely facing end surfaces 58, 60 may be ground or machined to be substantially planar or flat such that the end surfaces 58, 60 of the spring 50 may be aligned and seated against a substantially planar or complementary surface. For example and briefly referring back to FIG. 1, the oppositely facing end portions 58, 60 of the conventional compression spring 12 are seated, supported, or otherwise in contact with a substantially planar mating surfaces 14, 16. In many industries it is considered a common manufacturing practice to grind or machine down the oppositely facing end surfaces of a compression spring to enable the spring to be seated against a substantially planar surface.

Nevertheless and again referring back to FIG. 2, inner facing surfaces 66, 68 remain round or non-machined. In at least some types of compression springs and/or under certain loads, the inner facing surfaces 66, 68 may contact the adjacent coil under compression. With the rounded spring wire, the upper contacting coil may want to roll off the lower contacting coil and in some cases may become caught or locked beneath a lower contacting coil. In addition, the contact may operate as a stress concentration point on the adjacent coil eventually damaging or even causing failure of the compression spring. Further, this contact may operate as a rocker or hard point to change the stress/strain distribution within the coils of the spring, which in turn may adversely affect various loading conditions and may affect the operational life of the spring.

SUMMARY OF THE INVENTION

The present invention relates to compression springs and methods of making the same. More specifically and in one embodiment, the present invention relates to compression springs having end portions with selectively contoured inner contact surfaces to reduce contact stress and/or stress concentration effects on the adjacent coils when the compression spring is placed under load and the adjacent coil engages or contacts the end portion of the spring.

In accordance with an aspect of the invention, a compression spring includes a coil body arranged in a helical configuration with a mean coil diameter relative to a coil axis. The coil body may be formed with round-wire having a wire diameter. An end portion of the coil body extends from the coil body and includes a thickness in a direction substantially parallel to the coil axis and where the thickness is less than the wire diameter. The thickness of the end portion is defined by a first surface facing substantially away from the coil body and a second surface facing substantially toward the coil body. In one embodiment, the second surface includes a grooved portion formed into the thickness of the end portion.

In accordance with another aspect of the invention, a method of making a compression spring includes the steps of (1) fixing the compression spring to a holder, the compression spring having an end portion extending from a coil body, the end portion having a thickness defined by a first surface facing substantially away from the coil body and a second surface facing substantially toward the coil body; (2) moving a cutter in proximity to, yet spaced apart from, the second surface of the end portion; (3) moving the holder to place the second surface of the end portion into contact with the cutter; and (4) machining the second surface to reduce the thickness of the end portion.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

As will be described in further detail below, at least one embodiment of the invention includes a compression spring having an end portion with a selectively contoured inner contact surface. By way of example, the contour or profile of the inner surface may take a variety of forms, such as a planar surface, a concave surface, a V-shaped surface, etc. One purpose of selectively contouring or shaping the inner contact surface of the end portion of the spring is to reduce the amount of contact stress on an adjacent coil of the spring when the coil is compressed to a state where the end portion contacts the adjacent coil. In one embodiment, the contoured inner surface allows the adjacent coil to be received in a groove or channel formed in the end portion when the inner surface of the end portion was correspondingly machined. The groove or channel formed in the end portion may substantially reduce the effects of the rocker or hard point action during spring compression as described above in the background.

Figure 1:
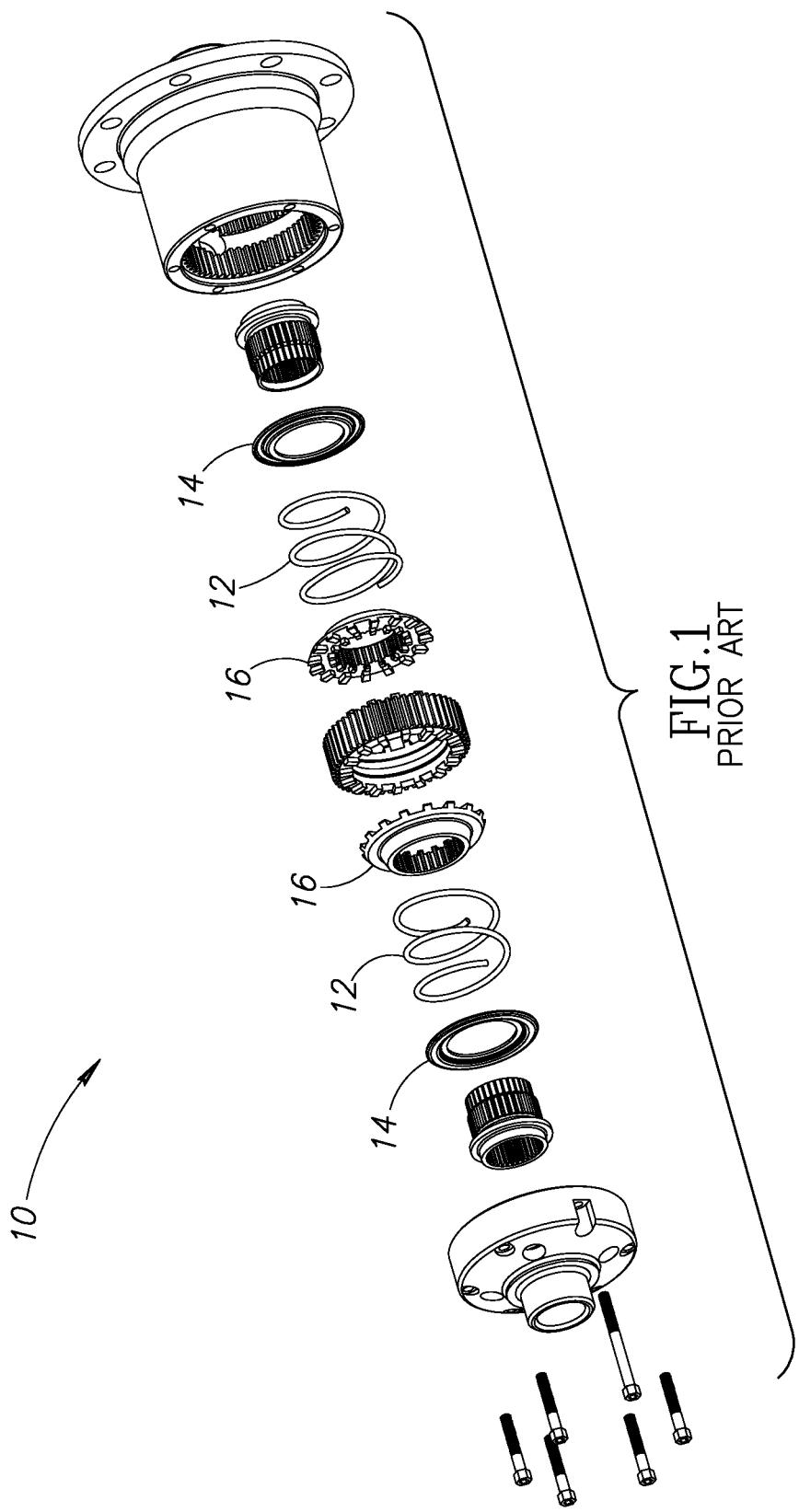
FIG. 1 is an isometric, exploded view of a prior-art compression spring located in a differential.
Figure 2:
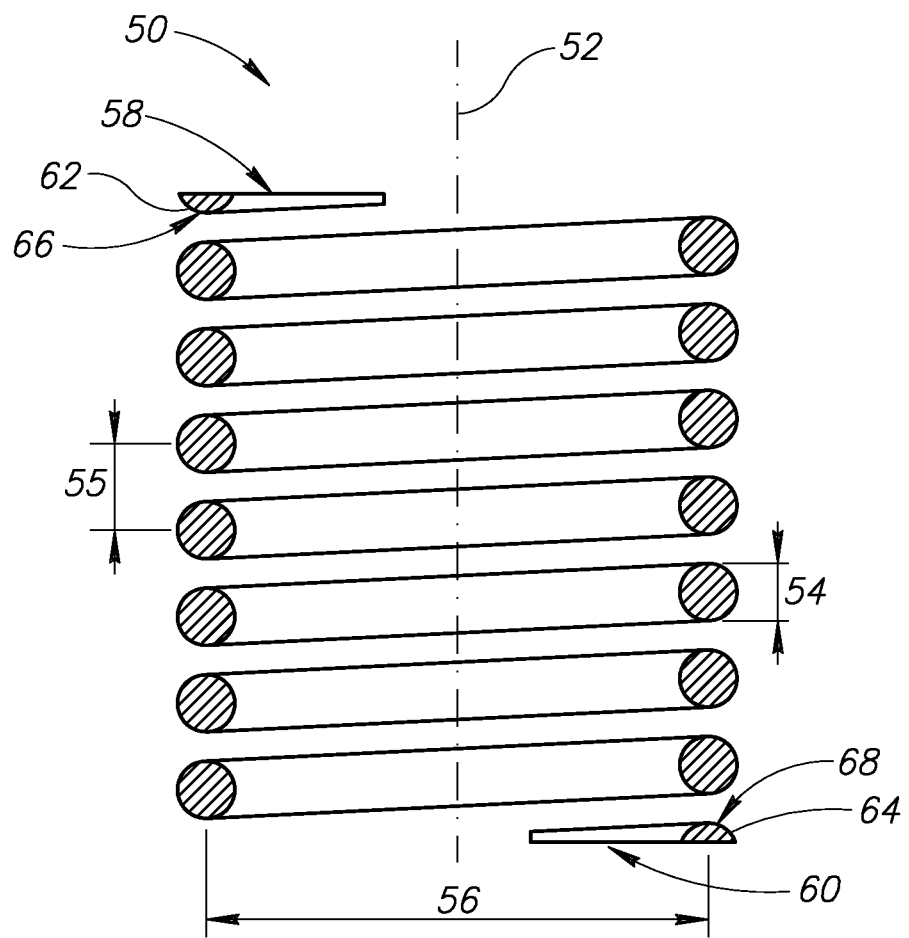
FIG. 2 is cross-sectional view of a prior-art compression spring showing various features of the spring.
Figure 3:
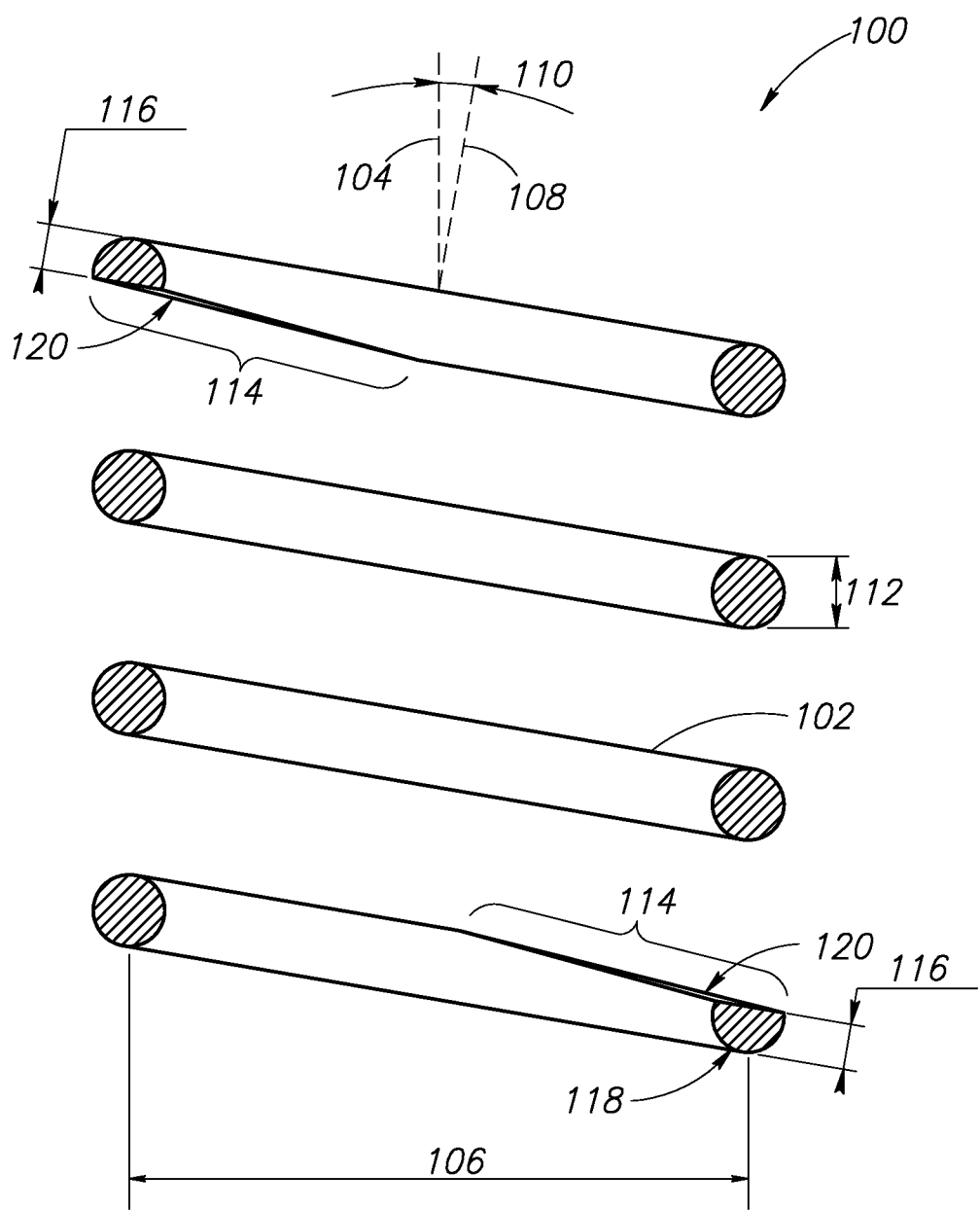
FIG. 3 is a cross-sectional view of a helical compression spring having end portions according to an embodiment of the present invention.

FIG. 3 shows a compression spring 100 having a coil body 102 arranged in a helical configuration. The coil body 102 is formed about a coil axis 104 with a mean coil diameter 106 relative to the coil axis 104. In one embodiment, at least several coils of the coil body 102 are oriented to be substantially perpendicular to a helical axis 108, which is offset from the coil axis 104 by a helical angle 110. The coil body 102 takes the form of round-wire (i.e., circular) having a desired wire diameter 112. The round-wire is preferably steel wire and may be heat treated and/or peened to increase the strength and operational life of the spring 100.

The spring 100 further includes end portions 114 that extend from the coil body 102. The end portions 114 have a thickness 116 defined by a direction substantially parallel to the helical axis 108. The thickness 116 of the end portions is defined by a first surface 118 facing substantially away from the coil body 102 and a second or inner surface 120 facing substantially toward the coil body 102. In addition, the thickness 116 of the end portions 114 is less than the wire diameter 112. For purposes of brevity, other structural aspects and features of compression springs, such as helical compression springs, may not be described in detail.

Figure 4:
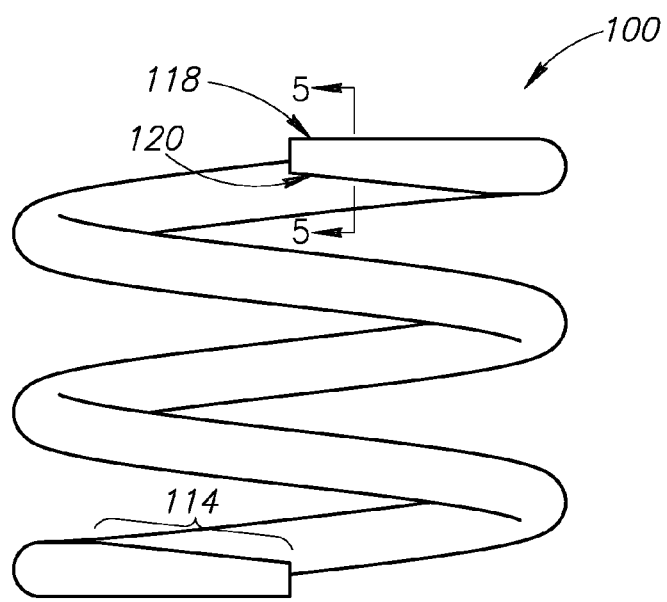
FIG. 4 is a side elevational view of the compression spring of FIG. 3.
Figure 5:
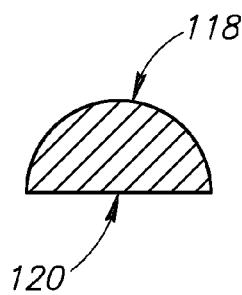
FIG. 5 is a cross-sections view of the end portion of the compression spring of FIG. 3 taken along line 5-5 in FIG. 4.

According to one embodiment, FIGS. 4 and 5 show the second surface 120 may be a non-circular surface, for example a planar surface as best illustrated in FIG. 5. The first surface 118, likewise, may retain the rounded profile corresponding to the round-wire of the coil body 102 or may be ground or machined to a planar surface as well.

Figure 6A:
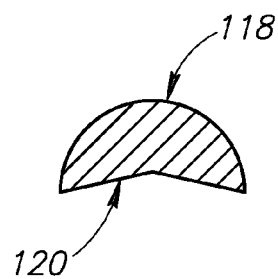
FIG. 6A a cross-sectional view of an end portion of a compression spring having a grooved inner surface according to another embodiment of the present invention.
Figure 6B:
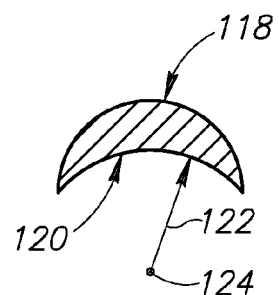
FIG. 6B a cross-sectional view of an end portion of a compression spring having a concave inner surface according to another embodiment of the present invention.

By way of example, FIGS. 6A and 6B show several alternate embodiments for the shape of the second surface 120. FIG. 6A shows the second surface 120 as being a V-shaped or grooved surface. FIG. 6B shows the second surface 120 as being an arcuate or concave surface having a desired radius 122 taken from center point 124. The radius 122 is preferably slightly greater than a radius (i.e., half of the diameter 112) of the round-wire coil body 102. Advantageously, the arcuate or concave surface 120 of the end portion 114 may reduce or eliminate the adjacent coil from rolling off under load because the surface 120 operates to complementarily receive and cradle the rounded coil body of the adjacent coil.

Thus in FIG. 6B, the end portion 114 of the coil body 102 takes the form of a concavo-convex end portion 114. Alternatively, it is appreciated that the second surface 120 may take other shapes, contours, or profiles other than those described above or shown in the respective drawings.

Figure 7:
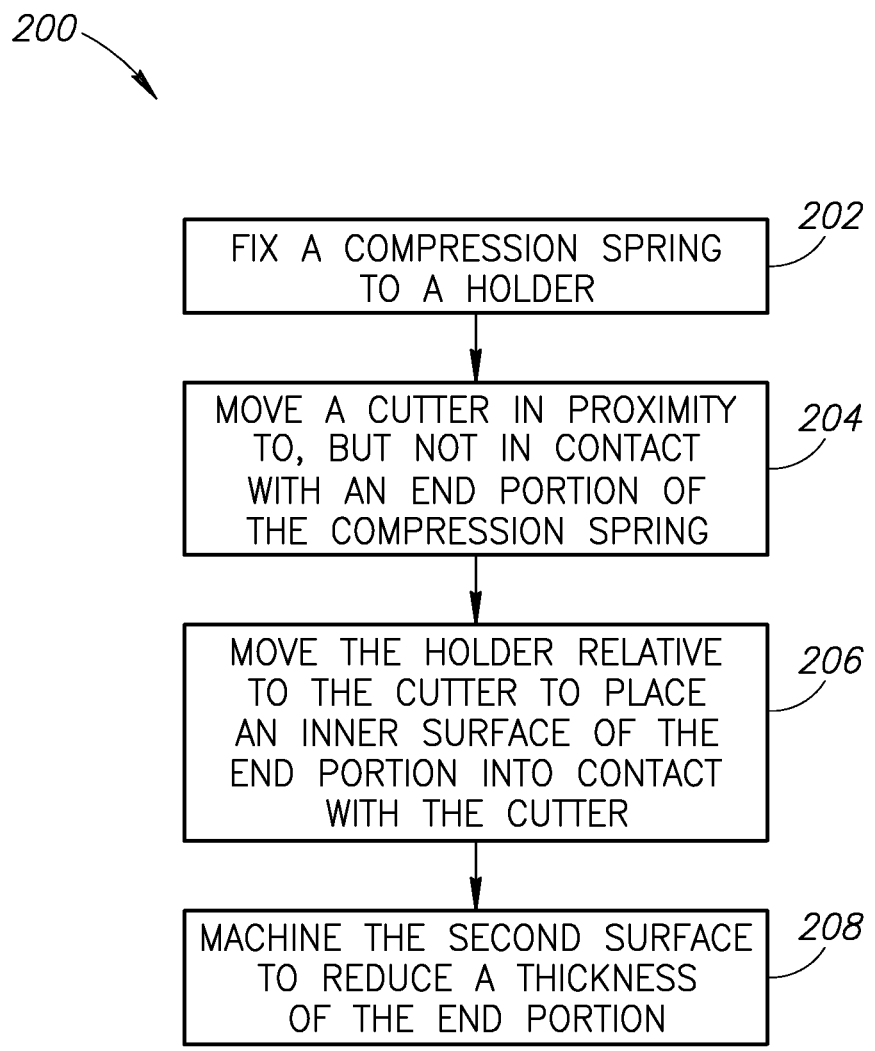
FIG. 7 is a flow diagram providing steps of manufacturing a helical compression spring with selectively contoured end portions according to an embodiment of the present invention.
Figure 8:
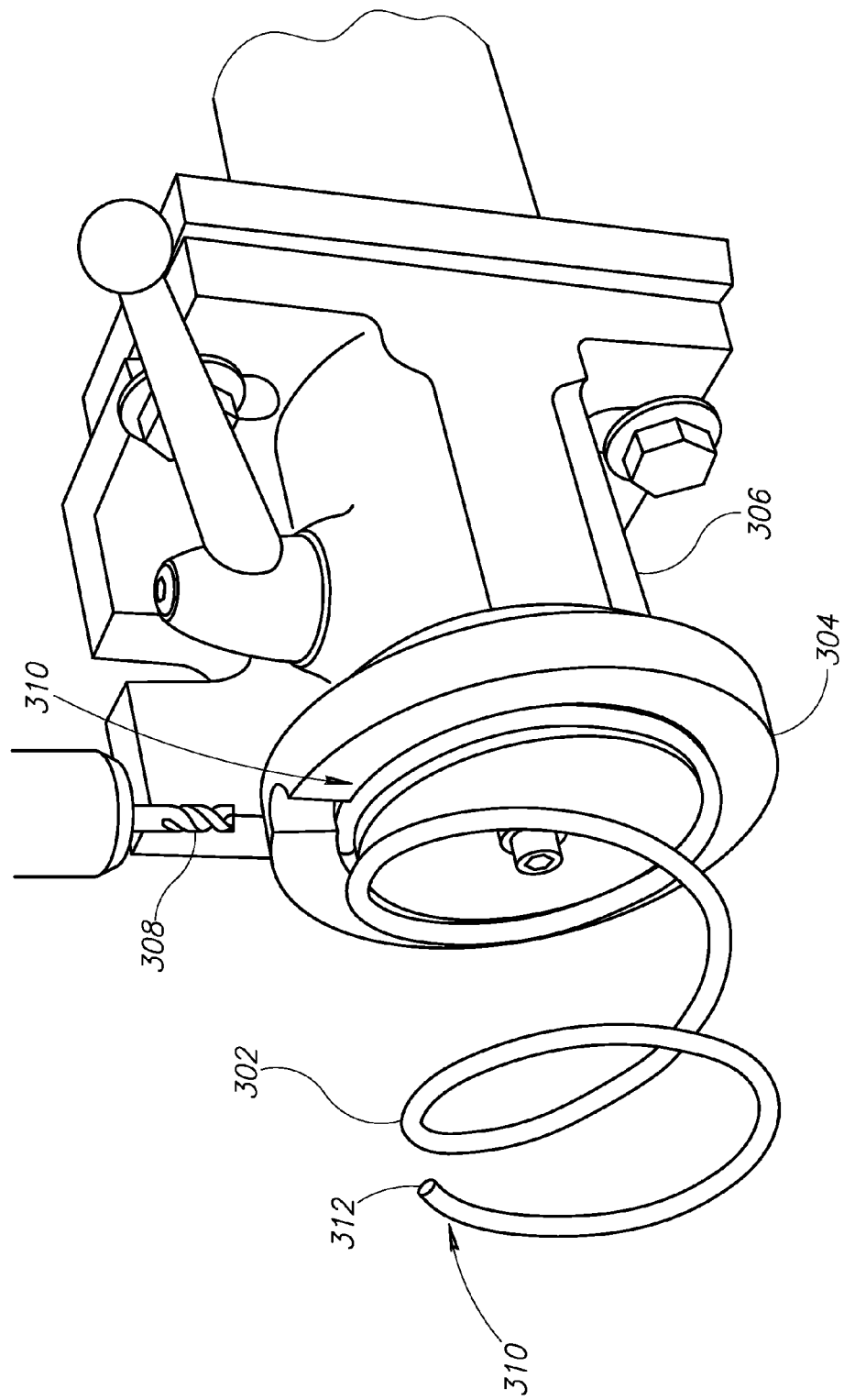
FIG. 8 is an isometric view of a tool with a holder fixed to a compression spring and a cutter positioned to engage an end portion of the compression spring according to an embodiment of the present invention.

FIGS. 7 and 8 shows a method 200 for making a compression spring 302 according to one embodiment of the present invention. FIG. 7 describes the various steps associated with making the compression spring 302 while FIG. 8 shows a system 300 used to manufacture the compression spring 302.

Referring to FIG. 8, the compression spring 302 may be fixed to a holder 304. For example, the compression spring 302 may be clamped, pressed onto or otherwise attached to a rotatable holder 304, which in turn may take the form of a collet. The holder 304 may be coupled to a tool 306, such as a lathe or rotary table, for rotational and translational control of the holder 304. Thus in FIG. 7, step 202 for manufacturing the compression spring 302 includes fixing the compression spring 302 to the holder 304. Next, step 204 includes moving a cutter 308 into proximity to, but not in contact with an end portion 310 of the compression spring 302. In the illustrated embodiment of FIG. 8, the compression spring 302 includes two end portions 310, but only one of the end portions 310 is shown as coupled to the holder 304. Although the illustrated embodiment shows the right-side end portion 310 being processed independently from the left-side end portion 310, it is appreciated that both end portions 310 may be processed simultaneously or contemporaneously using additional holders 304 and cutters 308. The cutter 308 may take the form of a milling cutter, a drill bit, a grinding wheel, a diamond cutter, or some other equivalent type of cutting or machining instrument capable of removing an amount of metallic material from the end portion 310 of the compression spring 302.

In a preferred embodiment, the holder 304, which is fixed to the compression spring 302, is translated approximately along the coil axis 104 (FIG. 3) to bring the cutter 308 into contact with the end portion 310 of the compression spring 302. Hence in step 206, the holder 304 is linearly translated relative to the cutter 308 to place the second or inner surface 120 (FIG. 3) into machining contact with the cutter 308. Lastly and in step 208, the second surface 120 (FIG. 3) is machined to reduce the thickness 116 (FIG. 3) of the end portion 310 and to further contour or shape the second surface 120 (FIG. 3). As described above, the shape of the second surface 120 may take a variety of forms, such as planar, grooved, or concave, for example. Once the end portion 310 has been machined, the compression spring 302 may be subjected to further treatments, such as being a heat treatment, shot peening, coating, etc. In addition, the compression spring 302 may be further processed by breaking off a free edge 312 of the end portion 310 and then chamfering the free edge 312. These latter steps may be accomplished with the milling cutter 308 by rotating or translating the holder 304 while the cutter 308 remains stationary.

In another embodiment, the compression spring 302 may be hand held to place the second or inner surface 120 (FIG. 3) into machining contact with a grinding belt, grinding wheel and/or a cutter 308. In one embodiment, the spring 302 is held and placed into machining contact with the grinding belt. In another embodiment, the spring 302 is clamped in a holder and a hand held cutter is used to contour or shape the second surface 120 (FIG. 3).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined by reference to the claims that follow.

The embodiments of the invention in which an exclusive property or privilege is claimed are defined as follows:

1. A method of making a compression spring, the method comprising:
   fixing the compression spring to a holder, the compression spring having an end portion extending from a coil body, the end portion having a thickness defined by a first surface facing substantially away from the coil body and a second surface facing substantially toward the coil body;

moving a cutter in proximity to, yet spaced apart from, the second surface of the end portion;

moving the holder to place the second surface of the end portion into contact with the cutter; and machining the second surface to reduce the thickness of the end portion.

2. The method of claim 1 wherein fixing the compression spring to a holder includes clamping at least a portion of the compression spring in a collet.

3. The method of claim 2 wherein moving the holder includes moving the collet.

4. The method of claim 1, further comprising:
breaking off a free edge of the end portion.

5. The method of claim 4, further comprising:
chamfering the free edge of the end portion.

6. The method of claim 1 wherein moving the cutter includes moving a milling cutter.

7. The method of claim 1 wherein moving the cutter includes moving a grinding wheel.

8. The method of claim 1 wherein moving the holder to place the second surface of the end portion into contact with the cutter includes rotating the holder on a multi-axis rotary tool.

9. The method of claim 1 wherein machining the second surface to reduce the thickness of the end portion includes removing an amount of material from the end portion with the cutter.

10. The method of claim 1 wherein machining the second surface includes making the second surface substantially planar.

11. The method of claim 1 wherein machining the second surface includes forming an arcuate, concave surface having a desired radius.

12. The method of claim 1, wherein machining the second surface includes forming non-planar and non-circular surface having a desired cross-sectional profile.

13. The method of claim 1 wherein machining the second surface includes grinding the second surface.

\* \* \* \* \*